Figure 1:
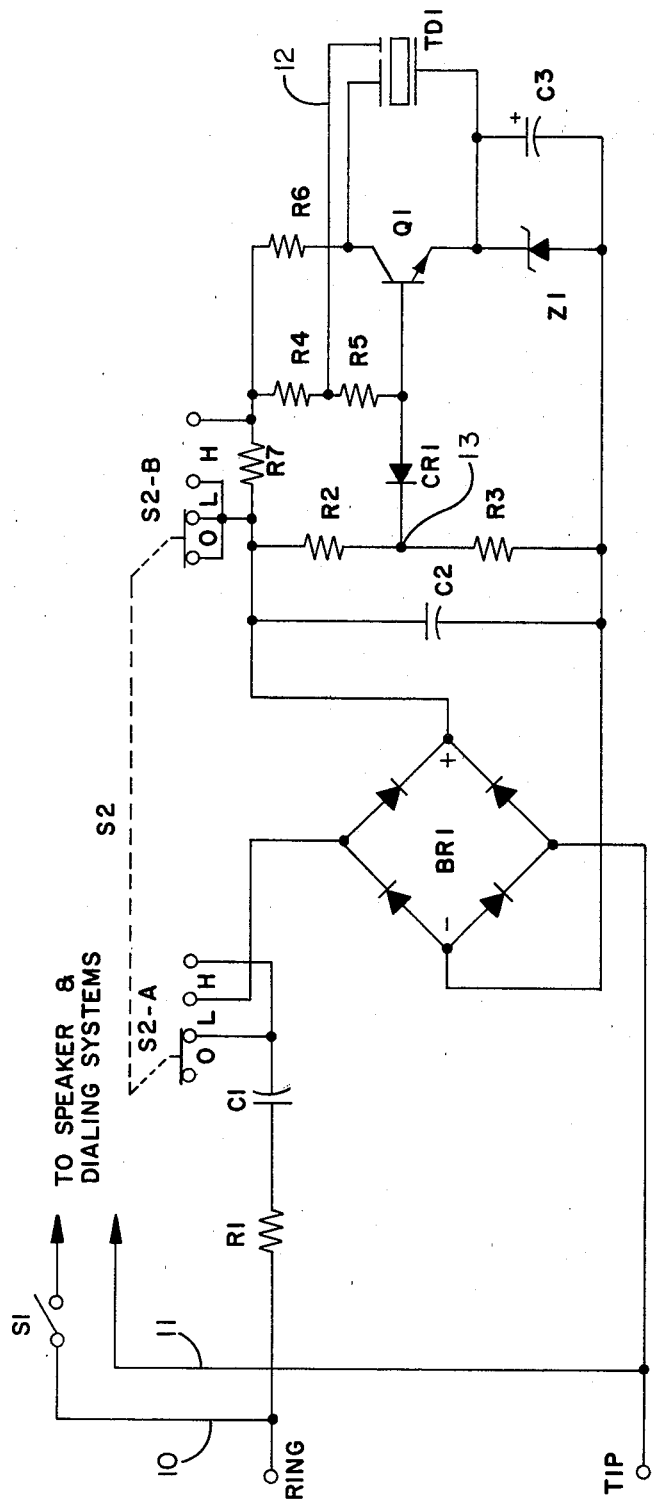

United States Patent [19] [11] 4,374,307
Haagen et al. [45] Feb. 15, 1983

[54] RINGER SYSTEM FOR A TELEPHONE

[75] Inventors: Peter H. Haagen, Arlington; Christopher R. Kline, Fort Worth, both of Tex.

[73] Assignee: Tandy Corporation, Fort Worth, Tex.

[21] Appl. No.: 182,695

[22] Filed: Aug. 29, 1980

[51] Int. Cl.³ .............................................. H04M 1/00
[52] U.S. Cl. .................................................. 179/84 T
[58] Field of Search .................. 179/84 R, 84 L, 84 T; 340/384 E

[56] References Cited

U.S. PATENT DOCUMENTS 3,387,097 6/1968 Beadle et al. ...................... 179/84 T
3,466,403 9/1969 Combridge et al. ............... 179/84 T

FOREIGN PATENT DOCUMENTS 2142858 3/1973 Fed. Rep. of Germany .... 179/84 T
2203857 8/1973 Fed. Rep. of Germany .... 179/84 T Primary Examiner—Joseph A. Popek
Attorney, Agent, or Firm—Gary V. Pack

[57] ABSTRACT

A telephone ringer system is disclosed which uses an oscillator circuit to drive a piezoelectric transducer to produce the ring signal.

3 Claims, 1 Drawing Figure

RINGER SYSTEM FOR A TELEPHONE

BACKGROUND OF THE INVENTION

This invention relates to telephone systems and more specifically to a ringer system for a telephone using a piezoelectric transducer to produce the ring signal.

SUMMARY OF THE INVENTION

In accordance with a specific embodiment, the subject invention utilizes an oscillator circuit with one transistor which is turned on in response to the receipt of an input ring signal. A ringer transducer in the oscillator circuit then oscillates, thereby producing an audible output ring sound indicating an incoming call.

The subject invention is designed to provide a simple ringer system having a minimum number of components, low manufacturing cost, and high reliability.

A better understanding of the invention and its advantages can be seen by reference to the detailed description of the invention which follows.

DESCRIPTION OF THE DRAWING AND THE PREFERRED EMBODIMENT

The FIGURE is an illustration of the circuit for the preferred embodiment of the telephone ringer system disclosed herein.

Referring to the FIGURE, the ringer circuit has two input terminals, designated as the "ring" and "tip" terminals, for connection to a standard telephone line. The ring and tip terminals are connected through leads 10 and 11 and hookswitch S1 to the telephone speaker and dialing systems (not shown). Switch S1 remains in its closed position when the telephone receiver is removed from the telephone and opens when the receiver is "hung up".

Resistor R1 is connected in series with the ring terminal and serves to limit the current flowing into the ringer circuit. Capacitor C1, which is connected in series with Resistor R1, provides DC isolation for the ringer circuit.

Diode bridge BR1 rectifies the AC input ring signal received at the ring and tip terminals. Capacitor C2 acts in conjunction with Resistor R1 and Capacitor C1 to prevent the ringing circuit from ringing until the input ring signal reaches a predetermined threshhold level. This feature prevents actuation of the ring circuit when dialing.

A voltage divider circuit comprised of Resistors R2 and R3 acts in conjunction with Diode CR1 and Zener Diode Z1 to control the base voltage level of Transistor Q1, and thereby its operation.

Oscillator Transducer TD1 produces an audible sound for the output ring signal for the telephone. In the preferred embodiment, Transducer TD1 is a piezoelectric crystal which is included in an oscillator circuit such that it is driven by Transistor Q1 to oscillate at a predetermined frequency.

The frequency which Transducer TD1 oscillates is determined by the physical parameters of the piezoelectric crystal itself. Resistors R4 and R5 serve as bias resistors for Transistor Q1.

Resistor R6 regulates the current flow through Transistor Q1, and thereby the current available to drive Transducer TD1. Lead 12 provides a feedback path from Transducer TD1 to assure oscillation of the oscillator circuit. Capacitor C3 is connected to the transducer TD1 to provide an emitter bypass for Transistor Q1. C3 also helps to stabilize the voltage across Zener Diode Z1.

As an additional option, the preferred embodiment may include a switching system which enables the user to disconnect the ringer circuit so that the telephone does not ring and/or permits the loudness of the ring signal to be controlled. This is accomplished by Switch S2 which has two individual switches, S2-A and S2-B, connected to operate in parallel, as is illustrated in the FIGURE. In the first position, which is illustrated in the FIGURE, and which is identified as the "O" position for "off", Bridge BR2 is disconnected from the ring terminal. The position of S2-B is not important. Upon Switch S2 being moved to its second position, the "L" or "low" position, the ringer circuit is connected to the ring terminal and Resistor R7 remains connected in the ringer circuit. However, upon moving Switch S2 into its third position, the "H" or "high" position, Resistor R7, is removed from the circuit, thereby increasing the power transmitted to Transducer TD1 through Transistor Q1, and causing TD1 to ring louder.

In operation, the ringer circuit is designed to cause Transducer TD1 to oscillate in response to the receipt of an input ring signal on the ring and tip terminals. The typical ring signal is usually an AC signal having a minimum voltage level of 45 VAC and an approximate frequency of 20 HZ. Assuming the input ring signal reaches the predetermined threshhold level, the rectified AC ring signal applied to Capacitor C2 will charge C2 and the voltage at the junction of Resistors R2 and R3 (Junction 13) will reach a predetermined voltage level. Transistor Q1 will then turn on, thereby causing Transducer TD1 to oscillate and to produce an audible ring sound.

More specifically, as the voltage level across C2 increases, bias current beings to flow through Transistor Q1, with Zener Diode Z1 maintaining the emitter terminal of Q1 at a predetermined level. Voltage divider Resistors R2 and R3 are chosen such that once the voltage across Capacitor C2 reaches a predetermined level, the voltage at the Junction 13 will cause Diode CR1 to become reversed biased, thereby causing the voltage level on the base of Q1 to rise sufficiently to enable Q1 to turn on. After the bridge output voltage (rectified AC ring signal) peaks and begins to fall again, the voltage level at the junction of Resistors R2 and R3 falls to a level which causes Diode CR1 to no longer be reversed biased, thereby turning off Transistor Q1. Once the rectified signal across Capacitor C2 begins to rise, Transistor Q1 is again turned on when the predetermined level at Junction 13 is reached. The length of time Transistor Q1 is turned on can be extended slightly by Capacitor C2, since it delays the turn off time for Q1 because it maintains a higher voltage level than that of the decreasing rectified AC ring signal.

During the time that Transistor Q1 is turned on, current is provided to Transducer TD1 through Resistors R7 (or Switch S2-B), R6, and Transistor Q1 to cause it to oscillate.

When Switch S2 is in its second, or low position, Resistor R7 is still connected in the circuit and reduces the power which is transmitted to Transducer TD1, thereby causing it to ring at a lower intensity. When Resistor R7 is shorted out of the ringer circuit, more current can flow through Transistor Q1, thereby permitting more power to be used to drive TD1.

While a particular embodiment of this invention has been shown and described, it is obvious that changes and modifications can be made without departing from the true spirit and scope of the invention. It is the intention in the appendant claims to cover all such changes and modifications.

The invention claimed is:

1. A telephone ringer system for producing an audible sound in response to an incoming ring signal, said ringer system comprising:
   detector means for detecting the receipt of an incoming ring signal to the ringer system and for producing an output signal related thereto, said detector means having a rectifying means for converting the alternating current of the ring signal to direct current, a voltage divider circuit and a capacitor, all connected in parallel; and
   oscillator circuit means having a piezoelectric transducer for producing an audible ring signal and driving means connected to said detector means and to the piezoelectric transducer, said driving means having a transistor with base, collector, and emitter electrodes, means for connecting the piezoelectric transducer between the collector and emitter electrodes, means for operatively connecting the base electrode to the detector means, and a combination of a zener diode and a second capacitor connected in parallel for connecting the emitter electrode of the transistor to the most negative terminal of the rectifying means, so that said oscillator circuit means oscillates and causes the piezoelectric transducer to produce an audible ring signal in response to the output signal from the detector means having at least a predetermined voltage.

2. The telephone ringer system recited in claim 1, further comprising a diode connected between the detector means and base, so that when said detector means output signal reaches the predetermined voltage, the diode is reverse biased, and the transistor is turned on from an off condition, thereby causing the oscillator circuit means to oscillate.

3. A telephone ringer system for producing an audible sound in response to an incoming ring signal, said ringer system comprising:
   ring and tip terminals;
   rectifying means having two input and two output terminals, each of said input terminals being connected to the ring and tip terminals, respectively;
   resistance means and first capacitance means connected in series between the ring terminal and the rectifying means;
   second capacitance means connected in parallel to the output terminals of the rectifying means;
   voltage divider means connected in parallel to the output terminals of the rectifying means and the second capacitance means, and having a designated terminal;
   at least one transistor;
   bias circuit means connected between the at least one transistor and the voltage divider means, wherein the bias circuit means includes a zener diode in parallel with a capacitor connecting the emitter terminal of the transistor to the most negative terminal of the rectifying means, so that when the designated terminal reaches a predetermined voltage level, the at least one transistor is turned on; and
   piezoelectric transducer means connected to said at least one transistor so that when the at least one transistor is turned on from an off condition, the at least one transistor and bias circuit means oscillates to cause an audible sound to be produced by the transducer.

* * * * *